United States Patent Office 2,777,774
Patented Jan. 15, 1957

2,777,774
OPTICAL GLASS

Gustav Weissenberg, Marburg (Lahn), and Norbert Meinert, Munchhausen, Germany, assignors to Ernst Leitz, G. m. b. H., Wetzler (Lahn), Germany, a corporation of Germany No Drawing. Application January 21, 1953,
Serial No. 332,558

Claims priority, application Germany February 26, 1952

2 Claims. (Cl. 106—47)

Our present invention relates to optical glass and more particularly to a glass of unusually low dispersion. These glasses are colorless and substantially not attacked by the atmosphere. Moreover they can be pressed at the temperatures customary for this purpose. A further advantage of these glasses is that they may easily be made free from striae.

It has long been known that phosphates of the alkaline earth metals alone, either singly or as a group, are indeed glass forming and easily yield crown glasses. These crown glasses are tied to various disadvantages. First, the index of refraction of the single metaphosphates is generally, relatively very low. Second, the metaphosphates are very viscous so that it is very difficult to form glass free from striae. It was therefore indeed proposed to melt metaphosphates with a slight excess of oxides of the same elements or with metasilicates or metaborates of the respective elements. Melting of the individual metaphosphates to crown glasses has been avoided for many years.

The new crown glasses of our invention are obtained by the common melting of a mixture of at least one metaphosphate of the elements of the group consisting of magnesium, calcium, strontium, barium with at least one oxide of an element of the group consisting of boron, calcium, strontium and barium. In a further development carbonates may also be combined with the metaphosphates and indeed from the group of elements consisting of lithium, sodium, strontium, and barium.

In a further development of the invention one or several metaphosphates are combined with oxides and carbonates. Further the metaphosphates may be combined with one or several orthophosphates of the same group while at the same time oxides or carbonates may be incorporated as additives. The oxides or the phosphate of lanthanum or indium may be added to raise the index of refraction of the mixed melt.

In the following tables various examples of these melts are given.

In Table 1, instead of boric oxide, a carbonate selected for the purpose from the group of elements consisting of lithium, sodium, strontium and barium is mixed with a metaphosphate, namely magnesium metaphosphate.

In Table 2 a metaphosphate, magnesium metaphosphate, is used with an oxide, namely boric oxide, and a carbonate, lithium carbonate.

In Table 3 again a metaphosphate, magnesium metaphosphate, an oxide, namely boric oxide, and two carbonates, lithium carbonate and barium carbonate, are used.

In Table 4 it is shown that a metaphosphate can be combined with an orthophosphate of a different base to form a glass and the table thus shows a mixture of magnesium metaphosphate and barium phosphate.

In Table 5 this mix is further expanded in that considerable amounts of boric oxide are added. In order to increase further the index of refraction there is shown in Table 6 a mix which contains as an additive an oxide of a metal of the group consisting of magnesium, calcium, strontium and barium, barium being the member. The refractive index can be raised substantially if an oxide of the third group of the periodic system, especially lanthanum, instead of the oxide of the second group of the periodic system, is added.

In Table 7 are shown mixes containing magnesium metaphosphate, barium orthophosphate and lanthanum oxide.

Table 8 shows that a combination of a metaphosphate and an orthophosphate with oxides and carbonates leads to equally good values.

In Table 9 are shown two orthophosphates with a metaphosphate and moreover an addition of lanthanum oxide.

Table 10 shows that through the combination of a carbonate with a fundamental mix of the same combination as in Tables 8 and 9 respectively in the presence of lanthanum oxide the $v$-value (dispersion) is materially improved. For stabilizing, it has been found of value to use phosphates of the elements, boron, lanthanum and indium.

Table 11 shows glasses with boron phosphate.
Table 12 shows glasses with lanthanum phosphate and indium phosphate, respectively.

The compositions given in the examples can be varied in wide measure—naturally they establish no bounds for the glasses of the invention. Besides the substances illustrated stabilizing agents can be added to the mixes such as silica, aluminum oxide, beryllium oxide, etc.

Since in practically all cases there is no coloration, not over 5% of decolorizing agent, such as arsenious oxide or the like, need be used.

Table 1
[In percent by weight.]

| Melt No. | Mg(PO₃)₂ | Li₂CO₃ | $n_D$ | $v$ |
|---|---|---|---|---|
| R246 | 95.2 | 4.8 | 1.5133 | 68.0 |
| R247 | 91.0 | 9.0 | 1.5188 | 68.1 |
| R248 | 83.3 | 16.7 | 1.5330 | 67.6 |
| R249 | 76.9 | 23.1 | 1.5405 | 67.5 |
| R250 | 71.4 | 28.6 | 1.5450 | 67.2 |

Table 2
[In percent by weight.]

| Melt No. | Mg(PO₃)₂ | B₂O₃ | Li₂CO₃ | $n_D$ | $v$ |
|---|---|---|---|---|---|
| R213 | 86.2 | 12.9 | 0.9 | 1.5223 | 69.2 |
| R214 | 85.8 | 12.9 | 1.3 | 1.5231 | 69.5 |
| R215 | 85.4 | 12.9 | 1.7 | 1.5249 | 69.5 |
| R212 | 84.5 | 12.7 | 2.8 | 1.5286 | 69.5 |
| W446/R233 | 80.0 | 12.0 | 8.0 | 1.5360 | 69.7 |
| W451/R268 | 76.0 | 11.4 | 12.6 | 1.5429 | 69.8 |
| R234 | 74.0 | 11.2 | 14.8 | 1.5483 | 69.4 |
| R235 | 69.0 | 10.4 | 20.6 | 1.5533 | 68.7 |
| R236 | 64.5 | 9.7 | 25.8 | 1.5559 | 68.5 |
| R237 | 60.5 | 9.2 | 30.3 | 1.5558 | 68.3 |
| R238 | 57.1 | 8.6 | 34.3 | 1.5567 | 67.5 |

Table 3
[In percent by weight.]

| Melt No. | Mg(PO₃)₂ | B₂O₃ | Li₂CO₃ | BaCO₃ | $n_D$ | $v$ |
|---|---|---|---|---|---|---|
| W437/R 241 | 74.0 | 11.2 | 7.4 | 7.4 | 1.5445 | 69.3 |
| R258 | 71.4 | 10.8 | 7.1 | 10.7 | 1.5489 | 69.1 |
| R259 | 69.0 | 10.4 | 6.9 | 13.7 | 1.5330 | 69.2 |
| R264 | 64.5 | 9.7 | 6.4 | 19.4 | 1.5610 | 68.6 |
| R265 | 62.5 | 9.4 | 6.2 | 21.9 | 1.5648 | 68.1 |

Table 4

[In percent by weight.]

| Melt No. | $Mg(PO_3)_2$ | $Ba_3(PO_4)_2$ | $n_D$ | $v$ |
|---|---|---|---|---|
| R52 | 40 | 60 | 1.5850 | 66.0 |
| R53 | 33.4 | 66.6 | 1.5930 | 66.7 |
| R54 | 28.6 | 71.4 | 1.6005 | 64.7 |
| R55 | 25 | 75 | 1.6053 | 64.4 |
| W298/R56 | 20 | 80 | 1.6118 | 64.2 |

Table 5

[In percent by weight.]

| Melt No. | $Mg(PO_3)_2$ | $Ba_3(PO_4)_2$ | $B_2O_3$ | $n_D$ | $v$ |
|---|---|---|---|---|---|
| R144 | 45.5 | 45.5 | 9 | 1.5751 | 67.0 |
| R151 | 41.7 | 41.7 | 16.6 | 1.5770 | 69.1 |
| W325/R158 | 38.4 | 38.4 | 23.2 | 1.5690 | 68.0 |

Table 6

[In percent by weight.]

| Melt No. | $Mg(PO_3)_2$ | $Ba_3(PO_4)_2$ | $B_2O_3$ | $BaO$ | $n_D$ | $v$ |
|---|---|---|---|---|---|---|
| W317/R152 | 38.5 | 38.5 | 15.3 | 7.7 | 1.5811 | 68.3 |
| R153 | 35.7 | 35.7 | 14.3 | 14.3 | 1.5928 | 66.0 |
| R154 | 33.3 | 33.3 | 13.3 | 20.1 | 1.6010 | 65.8 |

Table 7

[In percent by weight.]

| Melt No. | $Mg(PO_3)_2$ | $Ba_3(PO_4)_2$ | $La_2O_3$ | $n_D$ | $v$ |
|---|---|---|---|---|---|
| R85 | 32.9 | 65.8 | 1.3 | 1.5974 | 65.2 |
| R86 | 32.2 | 64.5 | 3.3 | 1.6046 | 65.0 |
| R87 | 31.3 | 62.5 | 6.2 | 1.6103 | 63.2 |

Table 8

[In percent by weight.]

| Melt No. | $Mg(PO_3)_2$ | $Sr_3(PO_4)_2$ | $B_2O_3$ | $BaO$ | $Li_2CO_3$ | $n_D$ | $v$ |
|---|---|---|---|---|---|---|---|
| R115 | 28.6 | 28.6 | 14.2 | 28.6 | | 1.6033 | 66.8 |
| R116 | 26.0 | 26.0 | 13.0 | 35.0 | | 1.6116 | 62.8 |
| R169 | 43.5 | 43.5 | 8.7 | | 4.3 | 1.5789 | 67.9 |
| R170 | 41.6 | 41.6 | 8.4 | | 8.4 | 1.5792 | 67.4 |
| R112 | 35.3 | 35.3 | 17.6 | | 11.8 | 1.5785 | 69.7 |
| R171 | 40.0 | 40.0 | 8.0 | | 12.0 | 1.5815 | 67.4 |
| R117 | 31.6 | 31.6 | 15.7 | | 21.1 | 1.5819 | 67.3 |
| R110 | 33.3 | 33.3 | 16.7 | 11.1 | 5.6 | 1.5877 | 68.7 |
| R111 | 33.3 | 33.3 | 16.7 | 5.6 | 11.1 | 1.5843 | 66.7 |
| R130 | 25.0 | 25.0 | 16.6 | 22.2 | 11.2 | 1.6020 | 66.3 |

Table 9

[In percent by weight.]

| Melt No. | $Mg(PO_3)_2$ | $Sr_3(PO_4)_2$ | $Ba_3(PO_4)_2$ | $La_2O_3$ | $n_D$ | $v$ |
|---|---|---|---|---|---|---|
| R89 | 40.0 | 40.0 | 20.0 | | 1.5846 | 68.3 |
| R90 | 33.4 | 33.3 | 33.3 | | 1.5934 | 67.3 |
| R91 | 39.6 | 39.6 | 19.8 | 1.0 | 1.5874 | 65.6 |
| R92 | 39.0 | 39.0 | 19.5 | 2.5 | 1.5902 | 64.5 |
| R94 | 33.0 | 33.0 | 33.0 | 1.0 | 1.5973 | 63.7 |
| R95 | 32.5 | 32.5 | 32.5 | 2.5 | 1.6007 | 65.2 |
| R96 | 31.7 | 31.7 | 31.7 | 4.9 | 1.6047 | 64.8 |

Table 10

[In percent by weight.]

| Melt No. | $Mg(PO_3)_2$ | $Sr_3(PO_4)_2$ | $La_2O_3$ | $Li_2CO_3$ | $n_D$ | $v$ |
|---|---|---|---|---|---|---|
| R82 | 48.8 | 48.8 | 1.2 | 1.2 | 1.5718 | 70.3 |
| R83 | 46.5 | 46.5 | 5.8 | 1.2 | 1.5838 | 68.6 |
| R84 | 44.0 | 44.0 | 11 | 1.0 | 1.5946 | 67.8 |

Table 11

[In percent by weight.]

| Melt No. | $Mg(PO_3)_2$ | $Ba_3(PO_4)_2$ | $BPO_4$ | $Sr_3(PO_4)_2$ | $n_D$ | $v$ |
|---|---|---|---|---|---|---|
| R179 | 41.6 | 41.6 | 16.8 | | 1.5711 | 67.5 |
| R178 | 45.4 | 45.4 | 9.2 | | 1.5710 | 67.0 |
| R177 | 40.0 | | 20.0 | 40.0 | 1.5697 | 68.0 |
| R176 | 44.5 | | 11 | 44.5 | 1.5708 | 68.0 |

Table 12

[In percent by weight.]

| Melt No. | $Mg(PO_3)_2$ | $Ba_3(PO_4)_2$ | $LaPO_4$ | $InPO_4$ | $n_D$ | $v$ |
|---|---|---|---|---|---|---|
| R60 | 27.2 | 67.5 | 5.3 | | 1.6101 | 62.7 |
| R61 | 31.2 | 62.5 | 6.3 | | 1.6022 | 64.2 |
| R62 | 29.4 | 58.9 | 11.7 | | 1.6050 | 63.6 |
| R65 | 31.4 | 63.0 | | 5.6 | 1.5965 | 66.2 |
| R66 | 29.8 | 59.5 | | 10.7 | 1.5982 | 63.4 |

Having described our invention, what we claim is:

1. Optical crown glass the glass forming constituents of which consist essentially of at least one metaphosphate of the group consisting of magnesium, calcium, strontium and barium, boron trioxide and at least one carbonate of the group consisting of magnesium, calcium, strontium, barium and lithium and being the heat reaction product of a batch having from 57% to 86% by weight of said metaphosphate and from about 8.6% to about 12.6% of boron trioxide and from 0.9% to 34.4% of said carbonate group.

2. Optical crown glass the glass forming constituents of which consist essentially of the heat reaction products of a batch having from 62% to 74% by weight of magnesium, metaphosphate; 6.2% to 7.4% by weight of lithium carbonate; 7.4% to 21.9% by weight of barium carbonate and 9.4% to 11.2% by weight of boron trioxide.

References Cited in the file of this patent

UNITED STATES PATENTS

| 2,278,501 | Tillyer et al. | Apr. 7, 1942 |
| 2,294,844 | Gelstharp | Sept. 1, 1942 |